United States Patent [19]

Kishita et al.

[11] Patent Number: 5,166,294

[45] Date of Patent: Nov. 24, 1992

[54] CURABLE SILICONE COMPOSITION

[75] Inventors: Hirofumi Kishita, Annaka; Koichi Yamaguchi; Shuji Suganuma, both of Takasaki, all of Japan

[73] Assignee: Shin-Etsu Chemical Co., Ltd., Tokyo, Japan

[21] Appl. No.: 509,221

[22] Filed: Apr. 16, 1990

[30] Foreign Application Priority Data

Apr. 17, 1989 [JP] Japan ................................. 1-96977

[51] Int. Cl.$^5$ ............................................. C08G 77/06
[52] U.S. Cl. .................................... 528/15; 525/478; 528/32; 528/42
[58] Field of Search ......................... 528/15, 32, 42; 525/478

[56] References Cited

U.S. PATENT DOCUMENTS 4,980,440 12/1990 Kendziorski et al. ............... 528/42
4,985,526 1/1991 Kishita et al. ........................ 528/32

FOREIGN PATENT DOCUMENTS 0147826 10/1985 European Pat. Off. .
0279706 8/1988 European Pat. Off. .
0311262 4/1989 European Pat. Off. .

OTHER PUBLICATIONS

Patent Abstracts of Japan vol. 12 No. 22 (C-470)(2869), Jan. 22, 1988; & JP-A-62174260 (Shin-Etsu) 31.07.1987 *Abstract*.

*Primary Examiner*—Melvyn I. Marquis
*Attorney, Agent, or Firm*—Oblon, Spivak, McClelland, Maier & Neustadt

[57] ABSTRACT

A curable silicone composition comprising as a basic component an organopolysiloxane having at least two silicon-bonded alkenyl groups, a silicon-bonded fluorine-containing substituent of the formula (I):

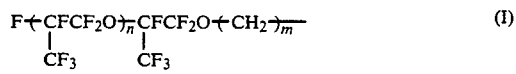

(I)

wherein m is an integer of from 1 to 4, and n is an integer of from 1 to 6, and/or the formula (II):

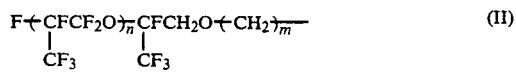

(II)

wherein m and n are as defined above, and at least one silicon-bonded fluorine-containing substituent of the formula (III):

$$C_lF_{2l+1}(CH_2)_k-$$ (III)

wherein k is an integer of from 1 to 4, and l is an integer of from 1 to 10, and/or the formula (IV):

$$C_lF_{2l+1}-(-CH_2-)_k-O-(-CH_2-)_m-$$ (IV)

wherein k, l and m are as defined above, and further comprising an organohydrogenpolysiloxane, and a platinum family metal catalyst. This composition can form a coating film having a low surface energy and therefore having good release properties, etc.

7 Claims, No Drawings

CURABLE SILICONE COMPOSITION

BACKGROUND OF THE INVENTION
1. Field of the Invention

The present invention relates to a curable silicone composition, and in particular to a curable silicone composition useful in forming a coating film having a low surface energy.

2 Description of the Prior Art

In recent years, pressure sensitive adhesives containing a dimethylpolysiloxane as the main component are used for extensive purposes because of their heat resistance, cold resistance, chemical resistance and electrical insulation property. They are also used in the medical field because of the non-toxicity.

However, since the adhesives have extremely strong adhesion, conventional release agents comprising a curable silicone cannot offer sufficient release properties. Particularly, if tapes or labels having a pressure sensitive adhesive layer containing a dimethylpolysiloxane as a main component are stored for a long term, the release force needed to peel the tape or label from the back of the tape or a support will increase markedly. Consequently, when peeling takes place, the pressure sensitive adhesive layer or the release agent layer is broken, so that the pressure sensitive adhesive tape or the label becomes useless. As a curable silicone that exhibits high release properties against such dimethylpolysiloxane-based pressure sensitive adhesives having a strong adhesion, there is known one comprised of an organopolysiloxane containing a fluorine-containing substituent having the formula: $C_nF_{2n+1}CH_2CH_2-$, where n is an integer of 1 or more (Japanese Pre-examination Patent Publication (KOKAI) Nos. 225581/1987 and 320/1988). This curable silicone, however, does not have sufficient release properties as a release agent for the above pressure sensitive adhesive, either.

SUMMARY OF THE INVENTION

Accordingly, an object of the present invention is to provide a curable silicone composition capable of forming a cured coating film having good release properties and durability of the release properties because of its markedly low surface energy.

The present invention provides, as a means solving said problems, a curable silicone composition comprising:

(a) an organopolysiloxane having:
at least two silicon-bonded $C_2-C_5$ alkenyl groups in its molecule,
at least one silicon-bonded fluorine-containing substituent selected from the group consisting of groups having the formula (I)

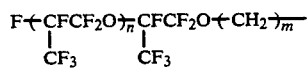

wherein m is an integer of from 1 to 4, and n is an integer of from 1 to 6, and groups having the formula (II):

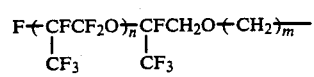

wherein m and n are as defined above in its molecule, and at least one silicon-bonded fluorine-containing substituent selected from the group consisting of groups having the formula (III):

$$C_lF_{2l+1}(CH_2)_k-  \qquad (III)$$

wherein k is an integer of from 1 to 4, and l is an integer of from 1 to 10, and groups having the formula (IV):

$$C_lF_{2l+1}-(-CH_2-)_k-O-(-CH_2-)_m- \qquad (IV)$$

wherein k, l and m are as defined above, in its molecule, (b) an organohydrogenpolysiloxane having at least two silicon-bonded hydrogen atoms in its molecule, and (c) a platinum family metal catalyst.

The composition of the present invention can adhere firmly to a variety of substrates such as paper, plastic films, metallic plates, metallic foil, and glass, and can be cured sufficiently to form a coating film having a low surface energy. The coating film has good release properties, water repellency and oil repellency, and particularly exhibits a sufficiently low peel force in practical applications, which low peel force is stable with time. Moreover, since the silicone component does not migrate to the pressure sensitive adhesive layer when used for pressure sensitive adhesive tapes, labels, etc., the composition is useful as a release agent for these items.

In addition, the composition is useful as a mold release agent to be used at the time of removal of molded or formed products from a mold in molding or vacuum forming various rubbers or plastics. Further, it is useful as an additive for a painting material used for the purposes of preventing scribbling, stickers or icing; water-repellency agents for textiles such as raincoats, tents and carpets; waterproofing agents or water repellency agents for building materials such as external wall covering materials and wall covering materials for bathrooms; and moisture proof coating materials for printed wiring boards, electronic parts, and the like.

DETAILED DESCRIPTION OF PREFERRED EMBODIMENTS

(a) Organopolysiloxane

The organopolysiloxane of the component (a) has the groups (a-1) to (a-3) each bonded to a silicon atom, as described below in its molecule.

(a-1) At least two $C_2-C_5$ alkenyl groups

The $C_2-C_5$ alkenyl group includes, for example, the vinyl group, allyl group and the like. The vinyl group and allyl group are preferred practically.

(a-2) at least one fluorine-containing substituent selected from the group consisting of the groups of said formula (I) and said formula (II). (hereinafter, generically referred to as Rf$^1$).

(a-3) At least one fluorine-containing substituent selected from the group consisting of the groups of said formula (III) and said formula (IV). (hereinafter generically referred to as Rf$^2$).

Normally, in the organopolysiloxane of the component (a), R$^1$ preferably comprises 1 mol % or more, more preferably 5-95 mol %, and R$^2$ preferably 0.1 mol % or more, more preferably 1-50 mol %, and the total content of R$^1$ and R$^2$ preferably comprises 2 mol % or more, more preferably 3-100 mol % of all the organic groups bonded to silicon atoms. If the total content of R$^1$ and R$^2$ is less than 2 mol %, the composition obtained by not exhibit sufficient release properties after cured.

The organopolysiloxane of the component (a) includes, for example, compounds having the formula (1):

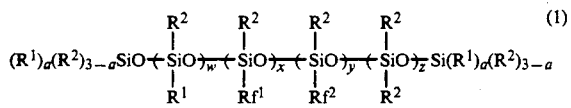

wherein $R^1$ may the same or different and represents a $C_2$-$C_5$ alkenyl group such as vinyl, allyl and the like; $R^2$ may be the same or different and represents a $C_1$-$C_8$ alkyl group such as methyl, ethyl, propyl, butyl, and the like, or the phenyl group; $Rf^1$ and $Rf^2$ are as defined above a is an integer of from 0 to 3, w is an integer of 0 or more, x and y are each an integer of 1 or more, and z is an integer of 0 or more.

Among the organopolysiloxane of the formula (1), compounds of higher practical use includes, for example, organopolysiloxanes terminated with the vinyl group at both ends represented by the formula (2):

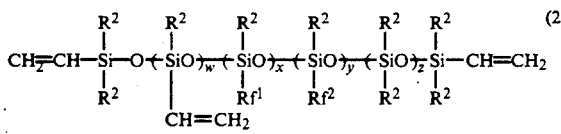

wherein $R^2$, $Rf^1$, $Rf^2$, w, x, y and z are as defined above.

The organopolysiloxane represented by the formula (2) above can be produced, for instance, by polymerizing an organocyclotrisiloxane having the fluorine-containing substituent ($Rf^1$) represented by the formula (3):

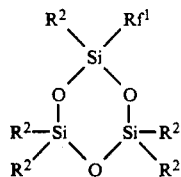

wherein $R^2$ and $Rf^1$ are as defined above, an organocyclotrisiloxane having the fluorine-containing substituent ($Rf^2$) represented by the formula (3a):

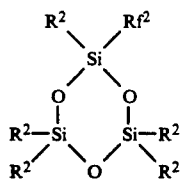

wherein $R^2$ and $Rf^2$ are as defined above, an organopolysiloxane terminated with the vinyl group represented by the formula (4):

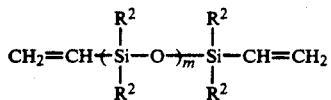

wherein $R^2$ is as defined above, and m is an integer of 1 or more, and optionally an organocyclotrisiloxane represented by the formula (5) and/or an organocyclotrisiloxane represented by the formula (6):

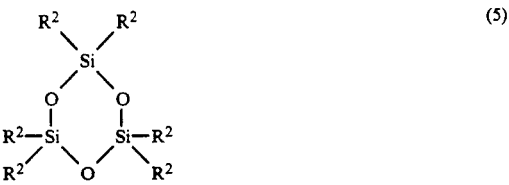

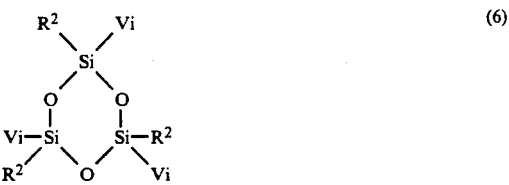

in the formulas (5) and (6) $R^2$ is as defined above and Vi represents the vinyl group, which compounds of the formula (5) and (6) are optionally used as required, in respective suitable amounts according to a desired end product, by known equilibrium reaction using an acid or alkali as a catalyst.

The organocyclotetrasiloxane having the fluorine-containing substituent represented by the formula (3) or (3a), used in the above exemplified production process, can be synthesized, for example, by reacting a disiloxanediol having the formula (7):

wherein $R^2$ is as defined above, with a dichlorosilane having the formula (8):

wherein $R^2$ is as defined above, and Rf means $Rf^1$ or $Rf^2$, in the presence of a tertiary amine such as triethylamine. This synthesis process is disclosed in detail in the Japanese Pre-examination Patent Publication (KOKAI) No. 71887/1989.

(b) Organohydrogenpolysiloxane

The organohydrogenpolysiloxane of the component (b) of the composition has at least two silicon-bonded hydrogen atoms in the molecule.

The organohydrogenpolysiloxane of the component (b) preferably has a fluorine-containing substituent, and more preferably has a fluorine-containing substituent selected from the ones represented by said formulas (I) to (IV) and bonded to a silicon atom, in its molecule. It is especially preferred that the fluorine-containing substituent comprises 2 mol % or more, preferably 3-90 mol %, of all the organic groups bonded to silicon atoms in view of compatibility with the organopolysiloxane of the component (a) and release properties obtained. Other substituents other than the fluorine-containing substituent include, for example, $C_1$-$C_8$ alkyl groups such as methyl, ethyl, propyl and the like, and the phenyl group.

The organohydrogenpolysiloxane of the component (b) includes, for example, polymers composed of a $R^2HSiO$ unit, a $HSiO_{1.5}$ unit, a $(R^2)_2SiO$ unit, a $R^2SiO_{1.5}$ unit, a $(R^2)_2HSiO_{0.5}$ unit, a $(R^2)_3SiO_{0.5}$ unit, a $R^2RfSiO$ unit, a $RfSiO_{1.5}$ unit, where $R^2$ is as defined above, and Rf represents $Rf^1$ or $Rf^2$ defined above. The organohydrogenpolysiloxane may be linear, branched or cyclic. Among these polymers, in regard to practical applications, preferred is a linear one having the formula (9):

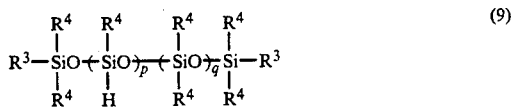

wherein $R^3$ represents a hydrogen atom, a $C_1$-$C_8$ alkyl group or the phenyl group; $R^4$ may be the same or different and each represent a $C_1$-$C_8$ alkyl group, the phenyl group or a fluorine-containing substituent selected from the group consisting of the groups represented by said formulas (I) to (IV); p is an integer of 1 or more and q is an integer of 0 or more, provided p is a number such that the number of hydrogen atoms bonded to a silicon atom is 3 or more.

The components (a) and (b) are used in amounts such that the ratio of the silicon-bonded alkenyl groups in the component (a) to the silicon-bonded hydrogen atoms in the component (b) is 1: at least 0.5, preferably ranges from 1:0.5 to 1:10, and more preferably from 1:1 to 1:5.

(C) Platinum family metal catalyst

The composition of the present invention contains the platinum family metal catalyst of the component (c) which catalyzes addition reaction of the components (a) and (b) This platinum family metal catalyst includes, for example, platinum family metals such as platinum, rhodium and iridium, and compounds thereof. Preferred are, for example, chloroplatinic acid, complexes of chloroplatinic acid with various olefins or vinylsiloxane, platinum black, and platinum supported on various carriers.

The platinum family metal catalyst of the component (c) may be normally added in an amount as adopted conventionally in the curable silicone compositions using the addition reaction of this type. That is, this catalyst is added in an amount of from 1 to 1,000 ppm in terms of platinum family metal content base on the total weight of the components (a) and (b).

Preparation and curing of the curable silicone composition

The composition of the present invention can be prepared by mixing uniformly the components (a), (b) and (c) in given amounts. In order to suppress the activity of the platinum family metal catalyst of the component (c), a retarder such as various organic nitrogen compounds, organic phosphorus compounds, acetylene compounds, oxime compounds and organic chlorine compounds may be optionally added as required.

Further, to the composition of the present invention, a filler may be added in order to reduce cure shrinkage or thermal expansion coefficient of cured products, to improve thermal stability, weather resistance, chemical resistance, fire retardance or mechanical strength of cured products, or to lower gas permeability. The fillers which may be used include, for example, fumed silica, quartz powder, glass fiber, carbon, metal oxides such as iron oxide, titanium oxide and cerium oxide, and metal carbonates such as calcium carbonate and magnesium carbonate. Suitable pigments, dyes or antioxidants can be also added.

The composition of the present invention thus obtained can be cured to form a rubbery elastic product by pouring it in a mold, followed by curing according to a known technique such as room temperature curing, heat curing, UV curing, etc. The curing can be carried out preferably by heat-treating, for instance, at 25° C. for 24 hours or longer, or at 100° C. for 30 seconds or longer.

The composition of the present invention may be diluted with an organic solvent such as chlorofluorocarbon, xylene hexafluoride, methyl ethyl ketone, and the like, and then applied to a given substrate, followed by curing according to a known method described above; thereby forming a coating film with a low surface energy.

Coating of the composition diluted with an organic solvent can be conducted by known techniques such as roll coating, spry coating, dip coating, etc., which are to be selected according to material of substrates, coating weight to be obtained, etc.

EXAMPLES

The present invention will now be described in detail by way of working examples and comparative examples. In the following description, part(s) denotes part(s) by weight.

The fluorine-containing substituents possessed by the organopolysiloxanes obtained in the Synthesis Examples are shown in Table 1.

Synthesis Example 1

Synthesis of vinyl group-containing organopolysiloxane (V-1)

In a container, the cyclotrisiloxane having a fluorine-containing substituent having the formula (10):

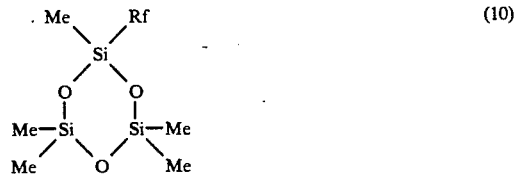

wherein Rf represents the group of:

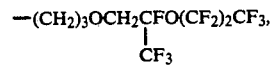

1,1,3,3-tetramethyl-1,3-divinyldisiloxane, the cyclotrisiloxane having the formula (11):

and hexamethylcyclotrisiloxane in molar ratio of 60:1 : 15:25 were stirred and mixed to give a mixture. To 100 parts of the mixture was added 0.2 parts of $CF_3SO_3H$, then equilibrium reaction was allowed to proceed at room temperature for 10 hours. Then, 0.2 parts of 28% aqueous ammonia was added, and the resulting mixture was stirred at room temperature for 1 hour. After the salts formed were filtered off with filter paper, and the mixture was subjected to stripping under 5 mmHg at 150° C. for 1 hour; thereby the vinyl group-containing organopolysiloxane (V-1) having the structure as shown in Table 2 was obtained.

Syntheses of vinyl group-containing organopolysiloxane (V-2 to V-17)

The vinyl group-containing organopolysiloxanes having the structure as shown in Table 2 were synthesized in the same manner as in Synthesis Example 1, except that in each case an organotrisiloxane which has a fluorine-containing substituent (Rf) corresponding to an intended organopolysiloxane was used and that one or more of cyclodimethyltrisiloxane, cyclomethylvinyltrisiloxane and cyclodiphenyltrisiloxane were used, according to an intended molecular structure.

Synthesis Example 2

Synthesis of orcanohvdrocenpolvsiloxane (H-1)

The cyclotrisiloxane having the formula (12):

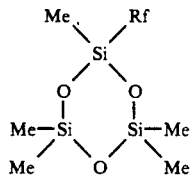
(12)

wherein Rf represents the group of:

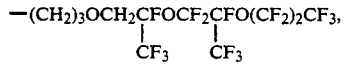

methylhydrogencyclotetrasiloxane, the cyclotrisiloxane of the formula (11), hexamethylcyclotrisiloxane and hexamethyldisiloxane acting as a stopper in a molar ratio of 20:6:2:3.3:1 were mixed. Thereafter, similarly to the procedure in Synthesis Example 1, equilibrium reaction was allowed to proceed by addition of $CF_3SO_3H$, and then neutralization with the aqueous ammonia was carried out, followed by filtration and stripping; thereby the organohydrogenpolysiloxane H-1 having the structure as shown in table 3 was obtained.

Syntheses of organohydrogenpolysiloxanes (H-2 to H-4 and H-6)

The organohydrogenpolysiloxanes H-2 to H-4 and H-6 were synthesized in the same manner as in the synthesis of the above H-1 except that a cyclic oligomer was chosen according to an intended molecular structure and that 1,1,3,3-tetramethyl-1,3-dihydrosiloxane was optionally used as a stopper as required.

Synthesis of the organohydrogencyclotetrasiloxane (H-5)

One mol of methylhydrogencyclotetrasiloxane and 1 mol of the compound having the formula:

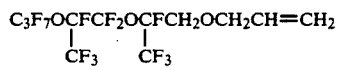

were mixed, and a platinum complex was then added thereto in an amount of 50 ppm in terms of platinum content based on the total weight of the above two compounds, followed by reaction at 80° C. for 3 hours. The resulting reaction mixture was distilled under reduced pressure to give the organohydrogencyclotetrasiloxane H-5 as a distillate at 107° C./3 mmHg.

TABLE 1

| Symbol | Fluorine-containing substituents Structure |
|---|---|
| A | $CF_3(CF_2)_2OCFCH_2OCH_2CH_2CH_2-$<br>　　　　　$\|$<br>　　　　$CF_3$ |
| B | $CF_3(CF_2)_2OCFCF_2OCFCH_2OCH_2CH_2CH_2-$<br>　　　　　$\|$　　　$\|$<br>　　　　$CF_3$　　$CF_3$ |
| C | $CF_3(CF_2)_2O(CFCF_2O)_2CFCH_2OCH_2CH_2CH_2-$<br>　　　　　　　$\|$　　　　$\|$<br>　　　　　　$CF_3$　　　$CF_3$ |
| D | $CF_3(CF_2)_2OCFCF_2OCFCF_2OCH_2CH_2CH_2-$<br>　　　　　$\|$　　　$\|$<br>　　　　$CF_3$　　$CF_3$ |
| E | $CF_3(CF_2)_3CH_2CH_2OCH_2CH_2CH_2-$ |
| F | $CF_3(CF_2)_5CH_2CH_2OCH_2CH_2CH_2-$ |
| G | $CF_3(CF_2)_7CH_2CH_2OCH_2CH_2CH_2-$ |
| H | $CF_3(CF_2)_3CH_2CH_2-$ |
| I | $CF_3CH_2CH_2-$ |

TABLE 2

Vinyl group - containing organopolysiloxane

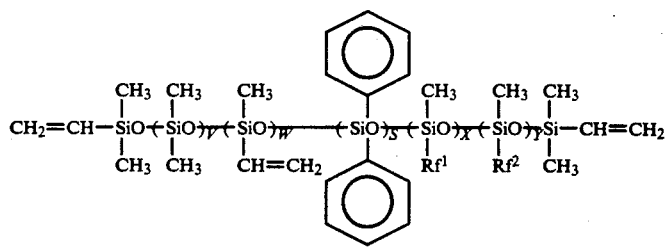

| No. | Rf¹ | Rf² | V | W | S | X | Y |
|---|---|---|---|---|---|---|---|
| V-1 | A | I | 195 | 0 | 0 | 60 | 45 |
| 2 | B | " | 210 | " | " | " | 30 |
| 3 | C | " | " | " | " | " | " |
| 4 | D | " | " | " | " | " | " |
| 5 | B | E | " | " | " | " | " |

TABLE 2-continued

Vinyl group - containing organopolysiloxane

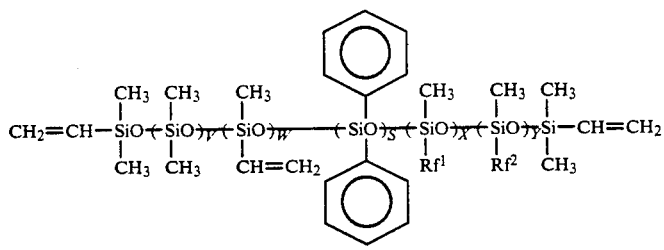

| No. | $Rf^1$ | $Rf^2$ | V | W | S | X | Y |
|---|---|---|---|---|---|---|---|
| 6 | " | F | " | " | " | " | " |
| 7 | " | G | " | " | " | " | " |
| 8 | " | H | " | " | " | " | " |
| 9 | " | I | 450 | " | " | 25 | 25 |
| 10 | " | " | 275 | " | " | 25 | 200 |
| 11 | " | " | 300 | " | " | 150 | 50 |
| 12 | " | " | 180 | 30 | " | 60 | 30 |
| 13 | " | " | " | 0 | 30 | " | " |
| 14 | — | I | 0 | 0 | 0 | 0 | 200 |
| 15 | — | H | 240 | 0 | 0 | 0 | 90 |
| 16 | B | I | 294 | 0 | 0 | 3 | 3 |
| 17 | — | — | 300 | 0 | 0 | 0 | 0 |

TABLE 3

Organohydrogenpolysiloxane

| No. | $Rf^1$ | $Rf^2$ | Structure |
|---|---|---|---|
| H-1 | B | I | $(CH_3)_3SiO(SiO)_{24}(SiO)_{20}(SiO)_{76}(SiO)_{750}Si(CH_3)$ with $CH_3$, H, $Rf^1$, $Rf^2$, $CH_3$ substituents |
| H-2 | A | E | " |
| H-3 | B | — | $(CH_3)_3SiO(SiO)_{25}(SiO)_{25}(SiO)_{750}Si(CH_3)$ with $CH_3$, H, $Rf^1$, $CH_3$ substituents |
| H-4 | — | H | $H-SiO(SiO)_{25}(SiO)_{25}(SiO)_{750}-Si-H$ with $CH_3$, $CH_3$, H, $Rf^2$, $CH_3$, $CH_3$ substituents |
| H-5 | B | — | cyclic $[(SiO)_{75}-SiO]$ with $CH_3$, H, $CH_3$, $Rf^1$ |
| H-6 | — | — | $(CH_3)_3SiO(SiO)_{750}Si(CH_3)_3$ with $CH_3$, H substituents |

EXAMPLES 1-17, COMPARATIVE EXAMPLES 1-3

In each example, the vinyl group-containing organopolysiloxane having a fluorine-containing substituent shown in Table 2 and the organohydrogen-polysiloxane shown in Table 3 were mixed such that the molar ratio of silicon-bonded hydrogen atoms/silicon-bonded vinyl groups (Si—H/Si—CH=CH$_2$) has the value as given in Table 4 to give a mixture. Five parts of the mixture so prepared was diluted with 95 parts of Freon TF (tradename of a fluorinated hydrocarbon supplied by Mitsui Dupont Fluoro Chemical), and 0.05 parts of a complex of chloroplatinic acid with a vinylsiloxane (platinum content: 2%) was added to prepare a composition.

The compositions thus prepared in the Examples and Comparative Examples have following features.

Examples 1-8: various fluorine-containing substituents were employed for the vinyl group-containing organopolysiloxane.

Examples 9-11: various polymerization degrees were employed for the vinyl-group containing organopolysiloxane, and the molar ratio of $Rf^1/Rf^2$ were varied.

Example 12: an organopolysiloxane having a vinyl group as a side chain was employed as the vinyl group-containing organopolysiloxane.

Example 13: an organopolysiloxane having a phenyl group was employed as the vinyl group-containing organopolysiloxane.

Examples 14-17: various fluorine-containing substituents were employed for the organohydrogen-polysiloxane.

Comparative example 1-2: the fluorine-containing substituents employed consist of the group: $C_nF_{2n+1}CH_2CH_2$- only.

Comparative Example 3: no fluorine-containing substituent was employed.

Subsequently, each composition as prepared above was coated on a polyethylene laminated sheet (support) by the method below to form a cured coating film. The resulting cured coating film was evaluated for peeling force and adhesion to the support after aging at 25° C.

(thickness: 30 μ). A polyester film (thickness: 50 μ) was laminated on the pressure sensitive layer, and was aged under a load of 20 g/cm² at 25° C. or 70° C. for one week.

Measurement of peeling force

The laminate aged at 25° C. or 70° C. for one week was pulled at the angle of 180° at a speed of 30 cm/min. by a tensile test machine to measure the force (g) required to peel the polyester film with the adhesive layer (i.e., pressure sensitive tape) from the cured coating film.

Measurement of adhesive force

The pressure sensitive adhesive tape peeled from the cured coating film was adhered to a stainless steel plate, and this tape was pulled at the angle of 180° at a speed of 30 cm/min. to measure the force (g) required for peeling.

TABLE 4

| Example | Composition of solutions | | | Properties | | | |
|---|---|---|---|---|---|---|---|
| | Vinylorgano-polysiloxane | Organohydrogen-polysiloxane | H/Vi ratio | 25° C. | | 70° C. | |
| | | | | Release force | Adhesion | Release force | Adhesion |
| 1 | V-1 | H-3 | 2.0 | 5 | 582 | 11 | 585 |
| 2 | V-2 | " | " | 5 | 590 | 12 | 591 |
| 3 | V-3 | " | " | 4 | 586 | 10 | 580 |
| 4 | V-4 | " | " | 5 | 591 | 12 | 593 |
| 5 | V-5 | " | " | 6 | 603 | 15 | 601 |
| 6 | V-6 | " | " | 5 | 586 | 10 | 590 |
| 7 | V-7 | " | " | 4 | 580 | 11 | 588 |
| 8 | V-8 | " | " | 6 | 606 | 16 | 598 |
| 9 | V-9 | H-1 | " | 10 | 598 | 21 | 601 |
| 10 | V-10 | " | " | 9 | 590 | 16 | 593 |
| 11 | V-11 | " | " | 4 | 578 | 9 | 576 |
| 12 | V-12 | H-3 | 3.0 | 5 | 592 | 10 | 590 |
| 13 | V-2 | " | " | 5 | 586 | 9 | 588 |
| 14 | " | H-2 | 2.5 | 6 | 601 | 12 | 592 |
| 15 | " | H-3 | " | 5 | 593 | 11 | 590 |
| 16 | " | H-5 | " | 6 | 589 | 12 | 581 |
| 17 | " | H-6 | " | 10 | 563 | 18 | 562 |
| Comparative example | | | | | | | |
| 1 | V-14 | H-6 | 2.0 | 318 | 582 | 425 | 578 |
| 2 | V-15 | " | " | 290 | 586 | 586 | 590 |
| 3 | V-17 | " | " | 460 | 580 | 580 | 583 | and 70° C. The results are given in Table 4.

1) Coating method

A composition is diluted with Freon TF to a concentration of 5%, and the solution obtained was applied to a polyethylene laminated paper with a bar coater No. 4. The laminated paper is heated at 150° C. for 60 seconds in a hot-air circulating drying chamber, thus a cured coating film being formed.

2) Evaluation method

Lamination of a pressure sensitive adhesive tape Examples 1-8 and 12-17, Comparative examples 1-3

A silicone pressure adhesive tape (Notofron No. 903UL, supplied by Nitto Denko Corp., width 19 mm) was laminated on the cured coating film, and the laminate was aged under load of 20 g/cm² at temperatures of 25° C. or 70° C. for one week.

Examples 9-11

A addition type silicone pressure sensitive adhesive (X-40-3004, supplied by Shin-Etsu chemical Co., Ltd.) was coated on the cured coating film, and heated at 130° C. for 60 seconds to form a pressure sensitive layer Table 4 shows that cured coating films from all the compositions of Examples 1-17 have sufficiently low release force in practical applications, and that no migration of adhesive to the cured film occurs. On the other hand, it is shown that the cured coating films obtained in Comparative Examples 1 and 2 have too large a release force to use in practical applications.

Example 18

A composition was prepared according to the following formulation: 100 parts of the vinylorganopolysiloxane V-10, 0.10 parts of the cyclotetrasiloxane having the formula:

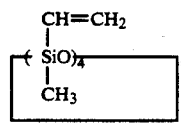

3.5 parts of the organohydrogenpolysiloxane H-4, and 0.3 parts of a complex of platinum-vinylsiloxane (platinum content: 0.5% by weight). The resulting composition was colorless and transparent, and had a refractive index (nD$^{25}$) of 1.372. The pot life of the composition was measured to be about 3 hours.

Subsequently, the composition was allowed to stand at 25° C., thereby being cured. The cured product obtained had a hardness after 24 hours and mechanical strength after 72 hours as given below.

| Hardness after 24 hours*: | 6 |
|---|---|
| Mechanical strength after 72 hours: | |
| Hardness* | 8 |
| Elongation | 185% |
| Tensile strength | 1.7 kg/cm$^2$ |

Remarks: *hardness was measured according to JIS (A).

We claim:
1. A curable silicone composition comprising:
(a) an organopolysiloxane having:
   at least two silicon-bonded C$_{[1]p}$ to C$_5$ alkenyl groups in its molecule,
   at least one silicon-bonded fluorine-containing substituent selected from the group consisting of groups having the formula (I):

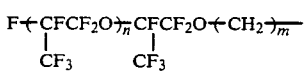  (I)

wherein m is an integer of from 1 to 4, and n is an integer of from 1 to 6, and groups having the formula (II):

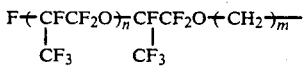  (II)

wherein m and n are as defined above in its molecule, and
at least one silicon-bonded fluourine-containing substituent selected from the group consisting of groups having the formula (III):

[C$_l$F$_{2l+1}$(CH$_2$)$_k$—]C$_p$F$_{2p+1}$(CH$_2$)$_k$—  (III)

wherein k is an integer of from 1 to 4, and [l]p is an integer of from 1 to 10, and groups having the formula (IV):

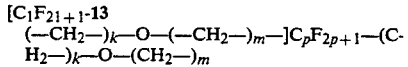

wherein k, [l]p and m are as defined above, in its molecule,
(b) an organohydrogenpolysiloxane having at least two silicon-bonded hydrogen atoms in its molecule, and
(c) a platinum family metal catalyst.

2. The composition according to claim 1, wherein the fluorine-containing substituents represented by the formula (I), (II), (III) and (IV) in said organopolysiloxane of the component (a) in total comprise at least 2 mol % of all the organic groups bonded to silicon atoms in the molecule.

3. The composition according to claim 1, wherein the organopolysiloxane of the component (a) is the compound having the formula (1):

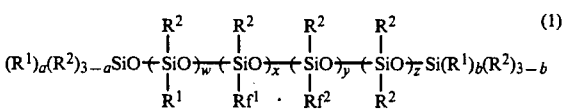  (1)

wherein R$^1$ may the same or different and represent a C$_2$–C$_5$ alkenyl group, R$^2$ may be the same or different and represents a C$_1$–C$_8$ alkyl group or the phenyl group, Rf$^1$ is at least one fluorine-containing substituent selected from the group consisting of the fluorine-containing substituents represented by the formula (I) and (II), Rf$^2$ is at least one fluorine-containing substituent selected from the group consisting of the fluorine-containing substituents represented by the formula (III) and (IV), a and b each is an integer of from 0 to 3, the sum of a and b being at least 2, w is an integer of 0 or more, x and y are each an integer of 1 or more, and z is an integer of 0 or more.

4. The composition according to claim 3, wherein the organopolysiloxane of the component (a) is the compound having the formula (2):

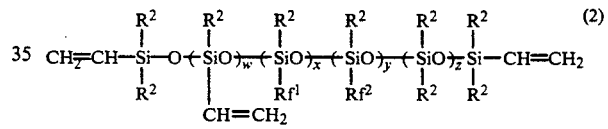  (2)

wherein R$^2$, Rf$^1$, Rf$^2$, w, x, y and z are as defined in claim 3.

5. The composition according to claim 1, wherein the organohydrogenpolysiloxane of the component (b) has a fluorine-containing substituent selected from the ones represented by said formulas (I) to (IV) and bonded to a silicon atom, in its molecule.

6. The composition according to claim 5, wherein said silicon-bonded fluorine-containing substituent in the organohydrogenpolysiloxane of the component (b) comprises at least 3 mol % of all the organic groups bonded to silicon atoms, in its molecule.

7. The composition according to claim 1, wherein the organohydrogenpolysiloxane of the component (b) is contained in an amount such that the ration of the silicon-bonded alkenyl groups in the component (a) to the silicon-bonded hydrogen atoms in the component (b) is 1: at least 0.5.

* * * * *

UNITED STATES PATENT AND TRADEMARK OFFICE
CERTIFICATE OF CORRECTION

PATENT NO. : 5,166,294
DATED : November 24, 1992
INVENTOR(S) : Hirofumi Kishita, et al It is certified that error appears in the above-indentified patent and that said Letters Patent is hereby corrected as shown below:

Claim 1, line 3, delete "$C_{[1]p}$" and insert -- $C_2$ --;

line 33, delete "$F-(-CFCF_2O-)-_n \underset{CF_3}{|} CFCF_2O-(-CH_2-)_m- \underset{CF_3}{|}$"

insert

-- $F-(-CFCF_2O-)-_n \underset{CF_3}{|} CFCH_2O-(-CH_2-)_m- \underset{CF_3}{|}$ --;

UNITED STATES PATENT AND TRADEMARK OFFICE
CERTIFICATE OF CORRECTION

PATENT NO.  : 5,166,294
DATED       : November 24, 1992
INVENTOR(S) : Hirofumi Kishita, et al It is certified that error appears in the above-indentified patent and that said Letters Patent is hereby corrected as shown below:

line 43, delete "$[C_lF_{2l-1}(CH_2)_k\!\!-\!\!]$";

line 45, delete "[1]"; line 49, delete "$[C_lF_{2l-1}^{-13}$"

line 50, delete "$(\!\!-\!\!CH_2\!\!-\!\!)_k\!\!-\!\!O\!\!-\!\!(\!\!-\!\!CH_2\!\!-\!\!)_m]$;

line 53, delete "[1]".

Signed and Sealed this

Second Day of August, 1994

Attest:

BRUCE LEHMAN

Attesting Officer    Commissioner of Patents and Trademarks